No. 700,516. Patented May 20, 1902.
G. S. LEE.
VEHICLE WHEEL.
(Application filed Dec. 31, 1901.)
(No Model.) 2 Sheets—Sheet 1.
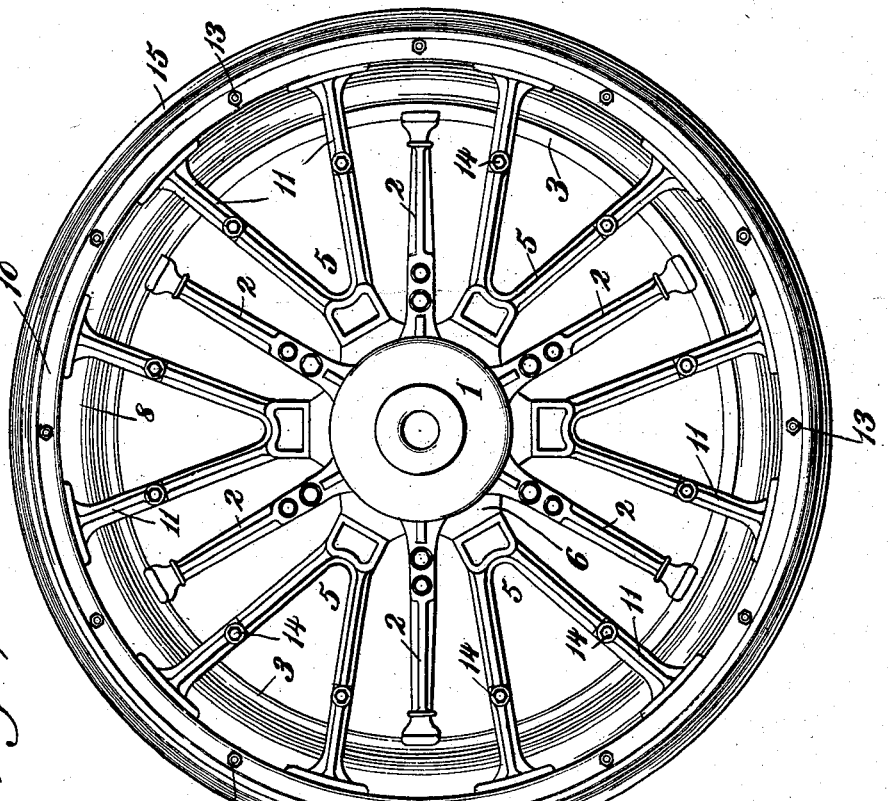
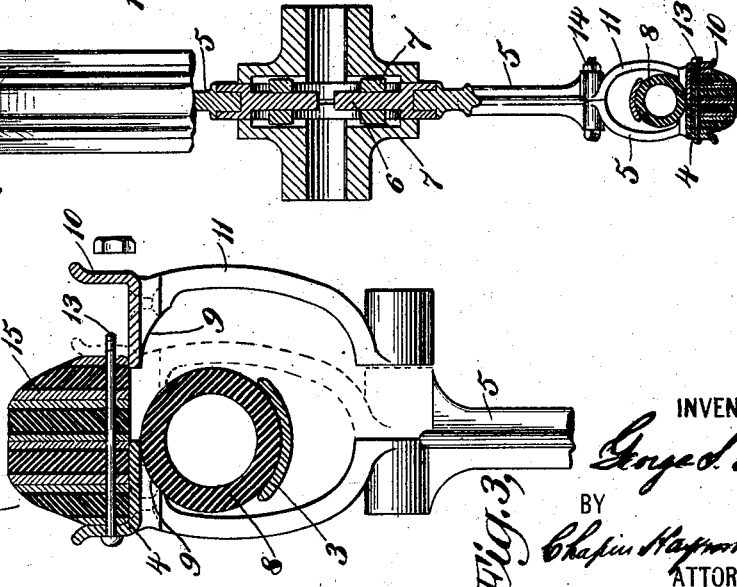

No. 700,516. Patented May 20, 1902.
G. S. LEE.
VEHICLE WHEEL.
(Application filed Dec. 31, 1901.)

(No Model.) 2 Sheets—Sheet 2.

WITNESSES:
Harry Goss
J. Wares Bryce

INVENTOR
George S. Lee
BY
Chapin Raymond Marble
his ATTORNEYS

THE NORRIS PETERS CO., PHOTO-LITHO., WASHINGTON, D. C.

UNITED STATES PATENT OFFICE.

GEORGE S. LEE, OF HAWTHORNE, NEW JERSEY, ASSIGNOR TO WHEEL WITHIN WHEEL COMPANY, OF NEW YORK, N. Y., A CORPORATION OF NEW JERSEY.

VEHICLE-WHEEL.

SPECIFICATION forming part of Letters Patent No. 700,516, dated May 20, 1902.

Application filed December 31, 1901. Serial No. 87,861. (No model.)

*To all whom it may concern:*

Be it known that I, GEORGE S. LEE, a citizen of the United States of America, residing at Hawthorne, county of Passaic, State of New Jersey, have invented certain new and useful Improvements in Vehicle-Wheels, of which the following is a specification, reference being had to the accompanying drawings, forming a part thereof.

My invention relates to vehicle-wheels, and particularly to vehicle-wheels of the general type described and claimed in United States Letters Patent No. 672,908, of April 30, 1901, and to the specific type described and claimed in a copending application for United States Letters Patent by me the serial number of which is 80,770 and date of filing November 1, 1901.

The primary object of the present invention is to afford ready accessibility to the cushioning device and to the outer tire or tread.

A further object is to simplify and improve the construction and reduce the number of parts in a wheel of the specific type set forth in the above-mentioned copending application and to somewhat lighten the wheel without decreasing its strength.

I will now proceed to describe a vehicle-wheel embodying my invention and will then point out the novel features in claims.

Figure 4:
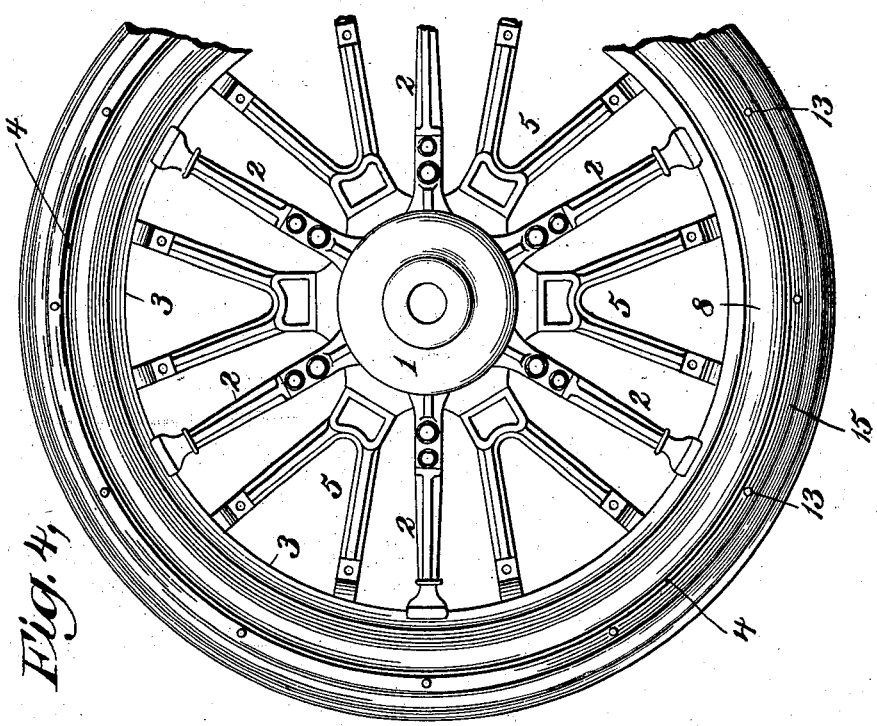
Figure 5:
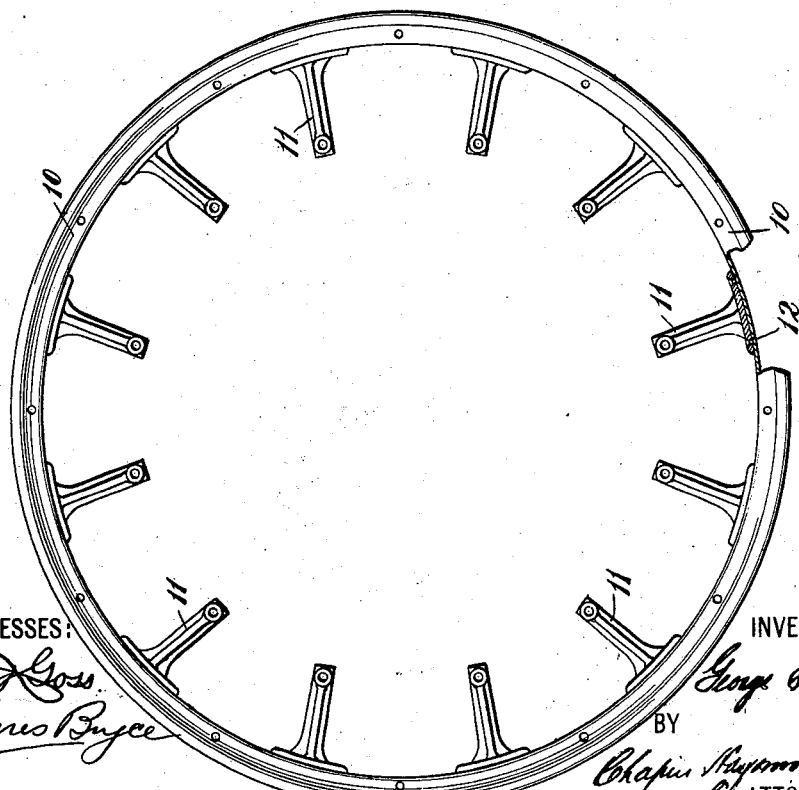

In the drawings, Figure 1 is a view in side elevation of a vehicle-wheel embodying my invention. Fig. 2 is a view in partial sectional transverse section and partial edge elevation. Fig. 3 is a detail view, on an enlarged scale, of certain parts, including the outer tire-rim, the outer tire or tread, the cushioning device, the hub-member rim, and a portion of one of the spokes with its removable portion partially removed therefrom. Fig. 4 is a view in side elevation of the wheel with the removable outer-tire-rim flange and the removable portions of the spokes omitted. Fig. 5 is a view in side elevation of the parts omitted from Fig. 4.

My improved wheel comprises two members, one carrying the hub portion, and which, as heretofore, I designate the "hub" member, and the other carrying the outer tire or rim, which I term the "tire" member. The hub member comprises a hub 1, a plurality of spokes 2, radiating therefrom, and a rim 3. The tire member comprises a rim 4, a plurality of spokes 5, and a floating plate 6. Intermediate guide-plates 7 may be interposed between the floating plate and the hub, whereby relative movement of the two members in the plane of rotation of the wheel may be permitted, but relative rotation of the members with respect to each other prevented.

An annular cushioning device, here shown as a flexible inflatable tube 8, is arranged between the hub-rim 3 and the outer tire-rim 4. The tube 8, comprising the cushioning device, is arranged to be supported by the rim 3 and to bear directly against the inner face of the outer tire-rim 4, as clearly shown in the drawings. It is prevented from lateral movement, first, by the curvature of the rim 3, and, secondly, by the fact that it is confined within and surrounded by the spokes 5. The spokes 5 at their outer central portions are beveled, as at 9, in order to substantially fit the portions of the cushioning device which they engage and being beveled away to substantially nothing permit the cushioning device to bear directly against the inner face of the outer tire-rim, as before stated. The effect of the foregoing is to dispense with the supporting-rim heretofore employed between the outer tire-rim and the cushioning device, and thereby to lighten, simplify, and cheapen the structure.

The outer tire-rim 4 is preferably provided with a removable flange 10 and the spokes 5 with removable portions 11. The rim 4 is preferably secured to the spokes 5, as by being riveted thereto, and the removable portion 11 of the spokes 5 are preferably secured to the removable flange 10, as by rivets 12. Bolts 13 are arranged to pass through the tire-rim 4 and to secure the removable flange thereto. Bolts 14 are adapted to secure the removable portions of the spokes 5 to the main portions thereof.

An outer tire or tread 15, of yielding material, is illustrated in connection with the vehicle-wheel herewith and is shown as supported by the rim 4. The bolts 13 pass through the said outer tire or tread and tend to secure the same in place. I do not describe the said tire-rim or tread 15 in detail herein, as the same forms no part of this present invention, but forms the subject-matter of a copending application the serial number of which is 87,860 and date of filing December 31, 1901. As far as this present invention is concerned the outer tire-rim may or may not be provided with a tread of yielding material, as may be desired, and the term "flange" as applied to the removable portion of the rim 4 is intended merely to designate a portion of the same comprising a complete ring and may have any desired cross-section.

When it is desired to obtain access to the cushioning device 8, and, if employed, to the yielding tire or tread 15, it is merely necessary to loosen the means for securing the flange 10 to the rim 4 and the removable portions 11 to the spokes 5 in order to remove the flange 10 and the removable spoke portions 11, and access may then immediately be had to all portions of the cushioning device and the yielding tread or tire 15. Fig. 4 shows the wheel with such parts removed, and Fig. 5 shows in detail such parts as have been so removed.

I do not desire to be limited to the precise details of construction and combination of parts as herein set forth, as the same may obviously be varied within wide limits without departing from the spirit and scope of my invention.

What I claim is—

1. A wheel comprising two relatively movable members, one a tire member and the other a hub member, and having a cushioning device between them, the tire member comprising a plurality of spokes having portions removable therefrom, and a rim secured to said spokes having a removable flange, said flange having the removable portions of said spokes secured thereto.

2. A wheel comprising two relatively movable members, one a tire member and the other a hub member, and having an annular cushioning device between them, the tire member comprising a plurality of spokes having portions removable therefrom, said removable portions, and the portions of the spokes opposite thereto, surrounding the said annular cushioning device, a rim secured to said spokes, and having a removable flange, said flange having the removable portions of said spokes secured thereto, and bolts for securing the removable flange and the removable spoke portions to the said rim and spokes.

3. A wheel comprising two relatively movable members, one a tire member, and the other a hub member, and having an annular cushioning device between them, the tire member comprising a rim and a plurality of spokes connected thereto, said spokes arranged to surround said cushioning device and beveled away at their outer central portions so as to form a support for said cushioning device at various points around the circle, but to permit said cushioning device to bear directly against the inner face of said rim.

4. In a wheel, the combination with a hub, spokes, and a rim, of an outer tire-rim, an annular cushioning device located between, and bearing directly against, said rim and the inner face of said tire-rim, a floating plate, and spokes surrounding said cushioning device and connecting said floating plate and said tire-rim together.

5. In a wheel, the combination with a hub, spokes, and a rim, of an outer tire-rim, an annular cushioning device located between, and bearing directly against, said first-named rim and the inner face of said tire-rim, a floating plate, and spokes connecting said floating plate and said tire-rim together, said spokes surrounding said cushioning device, and engaging same at various points around the circle.

6. In a wheel, the combination with a hub, spokes, and a rim, of an outer tire-rim having a removable flange, a floating plate, a plurality of spokes secured to the said tire-rim and to said floating plate, said spokes having each a removable portion, all of which said portions are secured to the said removable rim-flange, an annular cushioning device arranged between, and adapted to bear directly against, the said first-named rim and the inner face of said outer tire-rim, a plurality of bolts through the outer tire-rim, securing the removable flange thereto, and a plurality of bolts securing the removable portions of the spokes to the main portions thereof.

In witness whereof I have hereunto set my hand this 11th day of December, 1901.

GEORGE S. LEE.

Witnesses:
M. M. CONOVER,
C. F. CARRINGTON.